United States Patent
Onizawa

Patent Number: 5,990,204
Date of Patent: Nov. 23, 1999

[54] CROSSLINKING ISOPRENE-ISOBUTYLENE RUBBER WITH ALKYPHENOL-FORMALDEHYDE AND EPOXY RESINS

[76] Inventor: Masao Onizawa, 2-111-3, Owada-cho, Omiya-shi, Saitama-ken, Japan

[21] Appl. No.: 09/016,645

[22] Filed: Jan. 30, 1998

[30] Foreign Application Priority Data

Oct. 31, 1997 [JP] Japan ................... 9-315897

[51] Int. Cl.⁶ .............. C08K 3/22; C08K 3/26; C08K 3/36; C08L 9/00
[52] U.S. Cl. ........... 523/457; 523/434; 523/459; 523/467; 525/109
[58] Field of Search .............. 525/109, 141; 523/434, 459, 457, 467

[56] References Cited

U.S. PATENT DOCUMENTS

| | | | |
|---|---|---|---|
| 3,932,341 | 1/1976 | Kutch et al. | |
| 4,699,832 | 10/1987 | Sattlemeyer | 525/141 |
| 5,488,974 | 2/1996 | Shiota et al. | 138/125 |
| 5,502,109 | 3/1996 | Wallenwein et al. | 525/141 |

FOREIGN PATENT DOCUMENTS

| | | |
|---|---|---|
| 53-49055 | 5/1978 | Japan . |
| 3-247643 | 11/1991 | Japan . |
| 8-34886 | 2/1996 | Japan . |
| 8-134275 | 5/1996 | Japan . |

OTHER PUBLICATIONS

The Vanderbilt Rubber Handbook, 13th Ed., Ed. by R.F. Ohm, R.T. Vanderbilt Company, Inc., Norwalk, CT (1990) pp. 92–105.

Polysar butyl terpolymers. For the manufacture of sealants and adhesives. Bayer AG, Oct. 1993.

*Primary Examiner*—Robert E. Sellers
*Attorney, Agent, or Firm*—Sherman and Shalloway

[57] ABSTRACT

The present invention relates to a method for crosslinking an isoprene-isobutylene rubber with resins, and a crosslinked rubber product obtained by said method. According to the present invention, there are provided:

a method for crosslinking an isoprene-isobutylene rubber, which comprises adding, to 100 parts by weight of an isoprene-isobutylene rubber, 8–25 parts by weight of an alkylphenol-formaldehyde resin and 0.3–10 parts by weight of an epoxy resin such as bisphenol A epoxy resin, and a crosslinked rubber product obtained by the above method.

21 Claims, 4 Drawing Sheets

5,990,204

CROSSLINKING ISOPRENE-ISOBUTYLENE RUBBER WITH ALKYPHENOL-FORMALDEHYDE AND EPOXY RESINS

DETAILED DESCRIPTION OF THE INVENTION

1. Field of the Invention

The present invention relates to a method for crosslinking an isoprene-isobutylene rubber, more particularly, a method for crosslinking an isoprene-isobutylene rubber with a combination of an alkylphenol-formaldehyde resin and an epoxy resin; to a crosslinked rubber produced by the method; and to a rubber product produced therefrom. Incidentally, the term "resin" used in the present invention includes even a low-molecular compound.

2. Prior Art

Isoprene-isobutylene rubber (hereinafter abbreviated to "butyl rubber") is produced by copolymerization of isoprene and isobutylene, has an unsaturation degree of 0.5–3.0 mole %, and is a known synthetic rubber. Crosslinked butyl rubber has low gas permeability, weatherability, electrical insulation, heat resistance, damping property, resistances to acids and alkalis, low water absorption, etc. and is in use in rubber vibration insulator, automotive tube, rubber hose, wire covering, tank lining, curing bag, packing, rubber stopper, o-ring, etc.

For crosslinking of butyl rubber, there have been known three methods, i.e. sulfur crosslinking, quinoid crosslinking and resin crosslinking ("The Vanderbilt RUBBER HANDBOOK", R. T. Vanderbilt Company, Inc., 1990, 13th edition, pp. 92–105).

Sulfur crosslinking is conducted with a combination of sulfur and a crosslinking accelerator such as thiuram, thiazole or the like, and is in wide use for production of rubber vibration insulation, automotive tube, rubber hose, etc.

Quinoid crosslinking is conducted with a combination of red lead or lead dioxide and quinone dioxime or benzoylquinone dioxime, and is in use for production of wire-covering material, tank-lining material, etc. Quinoid crosslinking is quick and therefore is suitable for quick and continuous crosslinking such as employed in wire covering.

Resin crosslinking is conducted with a combination of an alkylphenol-formaldehyde resin and an inorganic halogen compound (e.g. tin chloride or ferric chloride) or a halogen-containing elastomer (e.g. chloroprene rubber or chlorosulfonated polyethylene), or with a halogenated alkylphenol-formaldehyde resin, and is in use for production of, for example, curing bag used in tire production.

Butyl rubber is an excellent material rubber when there is needed a rubber product having low gas permeability, low water absorption, electrical insulation, etc.

When a crosslinked rubber product must have substantially no corrosivity to metals such as copper alloy, aluminum, etc., selection of the crosslinking method applied to the material rubber used in said rubber product is very important. Examples of said rubber product are packings used at the joint of alloy (e.g. Cu or Al alloy) pipe; o-rings; rubber stoppers for metal containers; and so forth. For such products, sulfur crosslinking is undesirable because the reaction of sulfur and metal is anticipated.

Quinoid crosslinking satisfies the above requirement (substantially no corrosivity to metals). However, when quinoid crosslinking is conducted by the use of a hot press, the crosslinking takes place quickly; early crosslinking tends to occur; and troubles caused by scorching, such as strain of crosslinked product and the like tend to appear. Moreover, the raw material compound to be crosslinked has low storage stability.

Resin crosslinking is conducted using, together with an alkylphenol-formaldehyde resin, an inorganic halogen compound (e.g. ferric chloride), a halogen-containing elastomer (e.g. chloroprene rubber or chlorosulfonated polystyrene) or the like as a co-crosslinking agent in an amount of 1–10 parts by weight based on 100 parts by weight of the rubber to be crosslinked, or using a halogenated alkylphenol-formaldehyde resin.

Since resin crosslinking uses, in combination, a halogen compound which is easily liberated, causes staining of mold and, when tin chloride is used, causes even corrosion of mold.

Since resin crosslinking uses a halogen compound, it is not desirable when corrosion of metal (e.g. aluminum) caused by contact of the halogen compound with the metal becomes a problem.

Resin crosslinking takes place even when no halogen compound as co-crosslinking agent is used and only an alkylphenol-formaldehyde resin is used. However, crosslinking only with an alkylphenol-formaldehyde resin gives an insufficient reaction, resulting in nonuniform hardness and slow crosslinking. Therefore, in the case of butyl rubber, it is difficult to produce a rubber product having a JIS-A hardness of 65–85, particularly 75 or more by employing resin crosslinking and yet without causing reduction in electrical insulation. It is because the amount of carbon black (which is a reinforcing agent most effective for increase in hardness) used is restricted to avoid reduction in electrical insulation.

In conducting resin crosslinking, it has been a common technical knowledge among those skilled in the art to use an organic or inorganic halogen compound in combination with a alkylphenol-formaldehyde resin. Therefore, resin crosslinking is used for production of a rubber product intended for applications in which the use of such a halogen compound gives no harmful effect. When there is desired a crosslinked rubber product giving substantially no corrosion to the metal with which the rubber product comes in contact, and having sufficient electrical insulation and high hardness, the amount of carbon black used for increase in hardness is restricted as mentioned above; therefore, when a butyl rubber is crosslinked using no halogen compound as a co-crosslinking agent, the resulting crosslinked butyl rubber has low hardness and it is difficult to obtain an intended crosslinked butyl rubber.

To solve such a problem, there is used a partially crosslinked butyl rubber (hereinafter referred to as X-IIR) which is a terpolymer of isoprene, isobutylene and divinylbenzene (Polysar butyl terpolymers. For the manufacture of sealants and adhesives, issued by Bayer AG, October, 1993).

The feature of X-IIR lies in that X-IIR wherein divinylbenzene is introduced into a polymer, allows for organic peroxide crosslinking which has been impossible for isoprene-isobutylene copolymer butyl rubber.

The crosslinked X-IIR rubber causes no metal corrosion by crosslinking agent (organic peroxide) and has relatively desirable properties, but has a problem in productional operation thereof. That is, since X-IIR per se is partially crosslinked, its mixing with clay and carbon black (i.e. fillers) takes a 4- to 5-fold time as compared with the time taken in ordinary mixing operation; the resulting mixture is difficult to make into a smooth sheet; thus, the operational efficiency is very low; these problems are hardly solved even when EPDM or polyethylene is mixed.

The present invention provides a method for crosslinking a butyl rubber with resins without using any halogen compound, a crosslinked butyl rubber produced by the method, and a rubber product using said crosslinked butyl rubber; and thereby solves the above-mentioned problems of resin crosslinking.

TASKS TO BE ACHIEVED BY THE INVENTION

The first object of the present invention is to provide a novel method for crosslinking a butyl rubber with an alkylphenol-formaldehyde resin without using any halogen compound; a crosslinked butyl rubber produced by the method; and a rubber product using said crosslinked butyl rubber.

The second object of the present invention is to provide a crosslinked butyl rubber which causes substantially no metal corrosion when a rubber product produced therefrom comes in contact with a metal such as copper alloy, aluminum or the like; and a rubber product using said crosslinked rubber.

The third object of the present invention is to provide a raw material compound containing an isoprene-isobutylene copolymer as rubber, used for production of crosslinked butyl rubber, which compound has a short mixing time and excellent sheeting property, and thereby enhance the productional efficiency of crosslinked butyl rubber. The fourth object of the present invention is to provide a crosslinked butyl rubber product which has excellent electrical insulation of butyl rubber and yet has high hardness; and a method for producing a crosslinked butyl rubber suitable for use in said rubber product. Further objects of the present invention will become apparent from the following description.

Such a novel method for crosslinking a butyl rubber is very desirable.

MEANS FOR ACHIEVING THE TASKS

The above objects of the present invention can be achieved by:

(1) a method for crosslinking an isoprene-isobutylene rubber, which comprises adding, to 100 parts by weight of an isoprene-isobutylene rubber, 8–25 parts by weight of an alkylphenol-formaldehyde resin and 0.3–10 parts by weight of at least one kind of epoxy resin selected from the group consisting of a bisphenol A type epoxy resin, a bisphenol F type or AD type epoxy resin, a bisphenol type epoxy resin obtained by substituting one methyl group added to the skeleton of an AD type epoxy resin, with a $C_{2-12}$ alkyl group, a phenolic novolac type epoxy resin, a cresol novolac type epoxy resin, a polyfunctional epoxy resin, an alicyclic epoxy resin, a naphthol-modified novolac type epoxy resin and a glycidyl o-, m- or p-phthalate or o-, m- or p-hydrophthalate type epoxy resin, and a crosslinked isoprene-isobtylene rubber product obtained by said method; and (2) a method for crosslinking an isoprene-isobutylene rubber, which comprises adding, to a composition comprising 100 parts by weight of an isoprene-isobutylene rubber, 70–180 parts by weight of at least one kind of filler selected from kaolin clay, talc, calcium carbonate, mica, silica and zinc oxide and 10–60 parts by weight of carbon black, 8–25 parts by weight of an alkylphenol-formaldehyde resin and 0.3–10 parts by weight of at least one kind of epoxy resin selected from the group consisting of a bisphenol A type epoxy resin, a bisphenol F type or AD type epoxy resin, a bisphenol type epoxy resin obtained by substituting one methyl group added to the skeleton of an AD type epoxy resin, with a $C_{2-12}$ alkyl group, a phenolic novolac type epoxy resin, a cresol novolac type epoxy resin, a polyfunctional epoxy resin, an alicyclic epoxy resin, a naphthol-modified novolac type epoxy resin and a glycidyl o-, m- or p-phthalate or o-, m- or p-hydrophthalate type epoxy resin, and a crosslinked isoprene-isobutylene rubber product obtained by said method.

The isoprene-isobutylene rubber (butyl rubber) used in the present invention is produced by copolymerization of isoprene and isobutylene, has an unsaturation degree of generally 0.5–3.0 mole %, and is a known synthetic rubber. The scope of the present invention does not include any halogenated butyl rubber obtained by adding bromine or chlorine to an isoprene-isobutylene rubber.

The alkylphenol-formaldehyde resin used in the present invention can be any alkylphenol-formaldehyde resin which can be effectively used in the resin crosslinking of butyl rubber according to the present invention, and has no particular restriction. However, a compound of relatively low molecular weight having methylol group is used preferably.

There can be preferably used, for example, a mixture of low-molecular compounds each represented by the following formula:

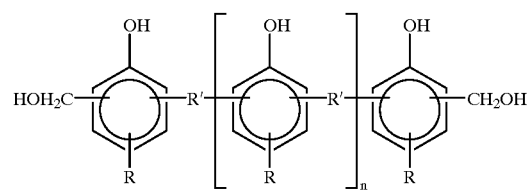

wherein n is 0–15, R is a $C_{1-10}$ aliphatic alkyl group, and R' is —$CH_2$— or —$CH_2OCH_2$—.

Such compounds are commercially available as, for example, TACKIROL 201 (trade name, a product of Taoka Chemical Company, Limited), HITANOL 2501 (trade name, a product of Hitachi Chemical Company, Ltd.), and SP-1044 and SP-1045 (products of Schenectady International, Inc., U.S.A.). The amount of the alkylphenol-formaldehyde resin added is 8–25 parts by weight, preferably 10–20 parts by weight based on 100 parts by weight of butyl rubber.

When the amount is less than 8 parts by weight, no intended effect is obtained. When the amount is more than 25 parts by weight, the sticking of raw material rubber is striking, resulting in reduced operability. Therefore, such amounts are not desirable.

Use of a halogenated alkylphenol-formaldehyde resin wherein the methylol group is substituted with bromine, or use of a halogenated alkylphenol-formaldehyde resin wherein the benzene ring has a halogen substituent(s), is unsuitable for the objects of the present invention and is not included in the scope of the present invention.

The epoxy resin used in the present invention is at least one kind of epoxy resin selected from the group consisting of a bisphenol A type epoxy resin, a bisphenol F type or AD type epoxy resin, a bisphenol type epoxy resin obtained by substituting one methyl group added to the skeleton of an AD type epoxy resin, with a $C_{2-12}$ alkyl group, a phenolic novolac type epoxy resin, a cresol novolac type epoxy resin, a polyfunctional epoxy resin, an alicyclic epoxy resin, a naphthol-modified novolac type epoxy resin and a glycidyl o-, m- or p-phthalate or o-, m- or p-hydrophthalate type epoxy resin. The amount of the epoxy resin used is 0.3–10 parts by weight, preferably 0.5–8 parts by weight per 100 parts by weight of butyl rubber.

The epoxy resin has an epoxy equivalent of 900 g/eq or less. An epoxy resin having an epoxy equivalent of 300 g/eq or less is desired.

When the amount of the epoxy resin used is less than 0.3 part by weight, no intended effect is obtained.

When the amount is more than 10 parts by weight, no additional effect is obtained and such an amount is uneconomical and undesirable.

In the present invention, use of an epoxy resin wherein the benzene ring or alkyl ring has a halogen (e.g. bromine) substituent(s), is undesirable for the objects of the present invention and is not included in the scope of the present invention.

Detailed description is made below on the epoxy resin used in the present invention.

The bisphenol A type epoxy resin is a reaction product between bisphenol A and epichlorohydrin and is represented by the following structural formula:

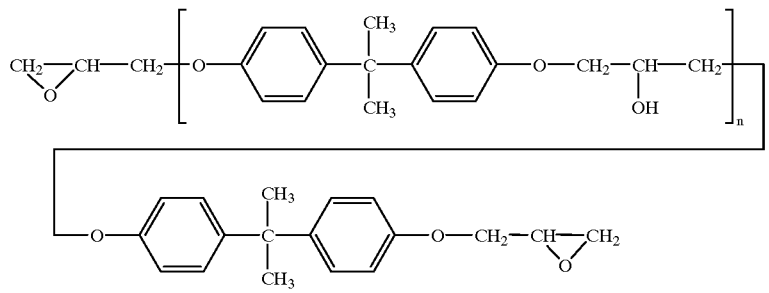

(bisphenol A type)

wherein n is 0 (zero) or a number larger than 0.

The bisphenol A type epoxy resin includes a liquid epoxy resin and a solid epoxy resin and has an epoxy equivalent of 900 g/eq or less. A bisphenol A type epoxy resin having an epoxy equivalent of 500 g/eq or less is preferred. The bisphenol A type epoxy resin preferably has a softening point of 100° C. or less as measured by the ring and ball method.

The bisphenol F or AD type epoxy resin is a reaction product between epichlorohydrin and bisphenol F or AD or a bisphenol obtained by substituting one methyl group added to the skeleton of bisphenol AD, with a $C_{2-12}$ alkyl group, and is represented by the following structural formulas:

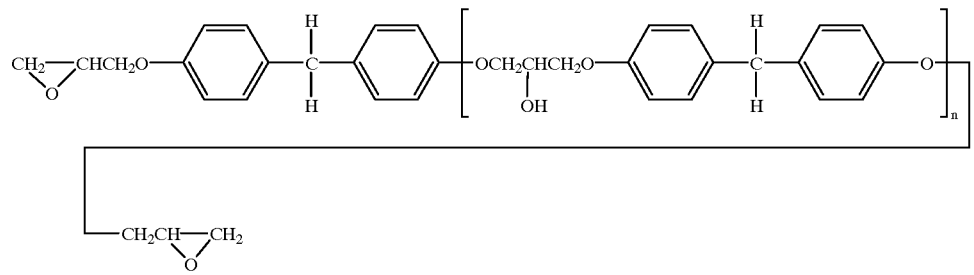

(bisphenol F type)

wherein n is 0 (zero) or a number larger than 0, and

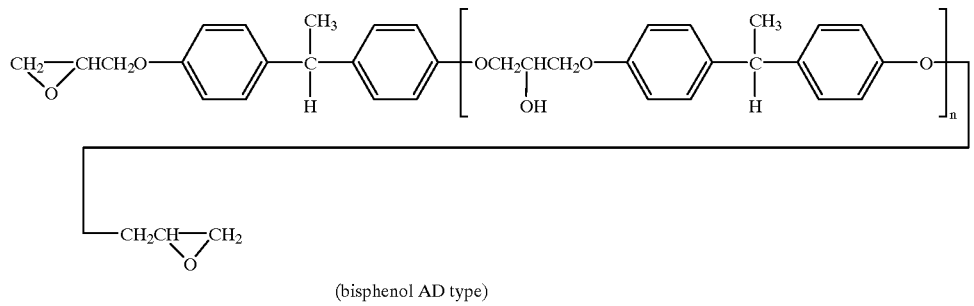

(bisphenol AD type)

wherein n is 0 (zero) or a number larger than 0.

The present invention includes also a bisphenol type epoxy resin obtained by substituting one methyl group added to the skeleton of bisphenol AD type, with a $C_{2-12}$ alkyl group. The epoxy resin is characterized by having a low viscosity at normal temperature and preferably has an epoxy equivalent of 300 g/eq or less.

The phenolic novolac type epoxy resin is a reaction product between a phenolic novolac resin and epichlorohydrin and is represented by the following structural formula:

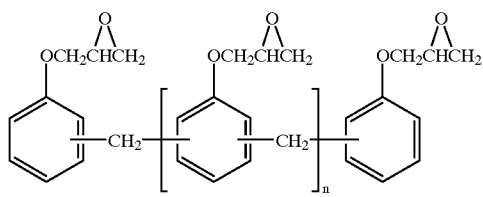

wherein n is 0 (zero) or a number larger than 0.

There is preferred a phenolic novolac type epoxy resin having an epoxy equivalent of 300 g/eq or less and a softening point of 100° C. or less as measured by the ring and ball method.

The cresol novolac type epoxy resin is a reaction product between an o-cresol novolac type resin and epichlorohydrin and is represented by the following structural formula:

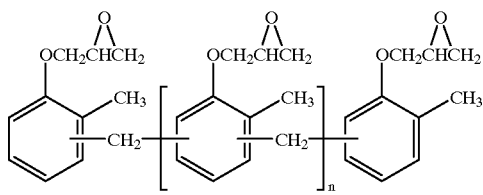

wherein n is 0 (zero) or a number larger than 0.

There is preferred a cresol novolac type epoxy resin having an epoxy equivalent of 300 g/eq or less and a softening point of 100° C. or less as measured by the ring and ball method.

As the naphthol-modified novolac type epoxy resin, there can be used, for example, those having an epoxy equivalent of 225–245 g/eq and commercially available as NC-7000 and 7020 Series (trade names, products of Nippon Kayaku Co., Ltd.). These resins have a softening point of 100° C. or less as measured by the ring and ball method.

The polyfunctional epoxy resin is, for example, epoxy resins represented by the following structural formulas and commercially available as EPPEN 500 series and FAE series (trade names, products of Nippon Kayaku Co., Ltd.):

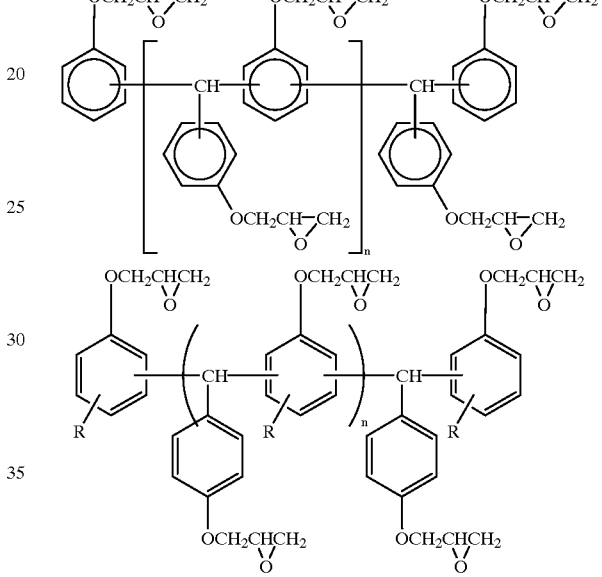

wherein R is a hydrogen atom or an alkyl group, and n is 0 (zero) or a number larger than 0.

The polyfunctional epoxy resin has an epoxy equivalent of 300 g/eq or less and has a softening point of 100° C. or less as measured by the ring and ball method.

The alicyclic epoxy resin is a compound obtained by oxidizing and epoxidizing the double bond of cyclohexene ring, and includes alicyclic epoxy compounds such as alicyclic diepoxy acetal, alicyclic diepoxy adipate, alicyclic diepoxy carboxylate, vinylcyclohexene dioxide and the like. The alicyclic epoxy resin is a liquid compound having an epoxy equivalent of 300 g/eq or less. The structural formulas of alicyclic diepoxy adipate and alicyclic diepoxy carboxylate are shown below.

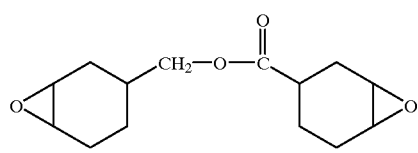

(Alicyclic diepoxy carboxylate)

-continued

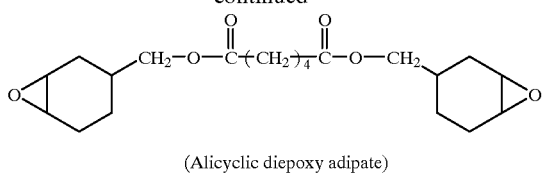

(Alicyclic diepoxy adipate)

The glycidyl o-, m- or p-phthalate or o-, m- or p-hydrophthalate type epoxy resin is a reaction product between epichlorohydrin and o-, m- or p-phthalic acid or o-, m- or p-hydrophthalic acid wherein the aromatic ring is hydrogenated. Examples thereof are compounds such as diglycidyl phthalate, diglycidyl tetrahydrophthalate, dimethylglycidyl phthalate, glycidyl ester of dimer acid, diglycidyl hexahydrophthalate, dimethylglycidyl hexahydrophthalate and the like. There is preferred a compound having an epoxy equivalent of 300 g/eq or less. The structural formula of diglycidyl tetrahydrophthalate is shown below.

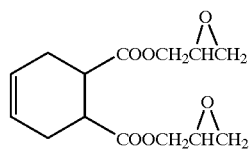

In the present invention, the epoxy resin has an effect of acting as a crosslinking accelerator and also an effect of allowing the resulting crosslinked rubber to have sufficiently high hardness. The obtained crosslinked rubber also has good compression set and can be suitably used in rubber products intended for sealing, such as packing and the like.

In carrying out the crosslinking of butyl rubber according to the present invention, there can be optionally added to the butyl rubber, besides the alkylphenol-formaldehyde resin and the epoxy resin, carbon black, kaolin clay, mica, silica, calcium carbonate, talc, softening agent, zinc oxide, stearic acid, antioxidant, stabilizer, silane, etc. all ordinarily used as fillers for rubber.

In carrying out the crosslinking of butyl rubber according to the present invention, there is no particular restriction as to the crosslinking conditions. However, it is preferable to conduct primary crosslinking at 170–210° C. for 5–10 minutes by the use of a hot press and secondary crosslinking at 170–210° C. for 30 minutes to 3 hours in an oven.

The present invention further provides a rubber product using a crosslinked rubber obtained by crosslinking an isoprene-isobutylene rubber with an alkylphenol-formaldehyde resin and an epoxy resin. The rubber product provided by the present invention includes a packing used at the joint of metal pipe, an o-ring, a packing for battery, a diaphragm, a rubber roll, a condenser cap, etc. and has properties necessary for rubber products used in contact with metals such as copper, aluminum and the like. The hardness required for the rubber product can also be easily achieved by varying the amount of carbon black added or the amount of paraffinic oil added (these approaches are ordinarily taken by those skilled in the art).

The present invention further provides a high-hardness rubber product having good volume resistivity and surface resistivity (these are a feature of isoprene-isobutylene rubber), used in applications of o-ring, packing for battery and condenser cap. The crosslinked rubber of the present invention can also be produced by a method for crosslinking an isoprene-isobutylene rubber, which comprises adding, to a composition comprising 100 parts by weight of an isoprene-isobutylene rubber, 70–180 parts by weight of at least one kind of filler selected from kaolin clay, talc, calcium carbonate, mica, silica and zinc oxide and 10–60 parts by weight of carbon black, 8–25 parts by weight of an alkylphenol-formaldehyde resin and 0.3–10 parts by weight of at least one kind of epoxy resin selected from the group consisting of a bisphenol A type epoxy resin, a bisphenol F type or AD type epoxy resin, a bisphenol type epoxy resin obtained by substituting one methyl group added to the skeleton of an AD type epoxy resin, with a $C_{2-12}$ alkyl group, a phenolic novolac type epoxy resin, a cresol novolac type epoxy resin, a polyfunctional epoxy resin, an alicyclic epoxy resin, a naphthol-modified novolac type epoxy resin and a glycidyl o-, m- or p-phthalate or o-, m- or p-hydrophthalate type epoxy resin.

In the present method, when there is used, as the epoxy resin, a commercially available epoxy resin used for LSI sealing, there can be provided a crosslinked rubber causing substantially no corrosion to metals.

The inorganic filler contained in the raw material rubber composition used for production of the crosslinked rubber of the present invention is a known rubber chemical classified as an inorganic reinforcing agent or an inorganic filler and is used for increase in processability without reduction in electrical insulation. The kaolin clay used in the present invention is so-called hard clay or soft clay, and is composed mainly of aluminum oxide and silicon oxide although the composition differs depending upon the place of origin. It may be calcined or a clay whose surface is treated with an aminosilane, a mercaptosilane or a vinylsilane. Talc is a hydrous magnesium silicate. Calcium carbonate is classified into precipitated calcium carbonate, heavy calcium carbonate, etc. and may be any of these. Silica is silicon dioxide generally called "white carbon" and is a known filler. These inorganic fillers can be used as an admixture of plural kinds. The amount of the inorganic filler used is generally 70–180 parts by weight per 100 parts by weight of butyl rubber.

Carbon black is used as an reinforcing component and may be any of furnace black, thermal black, etc. The addition amount is 60 parts by weight or less, preferably 10–60 parts by weight in order not to invite reduction in electrical insulation. The raw material rubber composition of the present invention may further contain an antioxidant, a stabilizer, stearic acid, an silane (e.g. vinylsilane or aminosilane). Each of these chemicals is added in an amount of 0.3–3 parts by weight per 100 parts by weight of butyl rubber.

EFFECTS OF THE INVENTION

When an isoprene-isobutylene rubber is crosslinked with an alkylphenol-formaldehyde resin (a phenolic resin) and an epoxy resin, the epoxy resin acts as a crosslinking accelerator and a crosslinked rubber of very high hardness can be obtained.

The raw material compound used in the present invention does not contain the filler in a large amount, has good sheeting property, and can give a high-hardness crosslinked rubber.

In the present invention, although the amount of the epoxy resin used is small, there can be obtained, as shown in Examples 1–27, a crosslinked rubber whose JIS-A hardness is higher by 7 to 21 than those of Comparative Examples. When such an increase in hardness is obtained by an increase in the amount of carbon black added, it is necessary to further add 14–40 parts by weight of HAF or FEF carbon black or 20–60 parts by weight of SRF carbon black, per 100 parts by weight of butyl rubber.

For production of a crosslinked rubber of high hardness and good electrical insulation intended by the present invention, an increase in carbon black amount is unsuitable.

When the high-hardness crosslinked rubber of the present invention is desired to obtain by an increase in the amount of inorganic filler used, an increase in, for example, hard clay or calcium carbonate amount by 20–50 parts by weight is necessary to achieve an increase in hardness by 7. In this case, there appear inconveniences such as difficulty in mixing, reduction in physical properties, etc.

The present method allows for easy production of a crosslinked rubber of high hardness and excellent electrical insulation.

The uncured compound according to the recipe of the present invention is excellent in sheeting property which is important in production process.

The effect of the epoxy resin on the phenolic resin crosslinking may be called as twin-resin cure and is completed by a combination of two kinds of resins. The present invention provides a crosslinked rubber most suitably used for production of rubber products such as hard butyl rubber roll, packing used at the joint of metal pipe, o-ring, packing for battery, sealing rubber for electrolytic condenser and the like, and such rubber products.

EXAMPLES

The present invention is described below in more detail by way of Examples and Comparative Examples. Incidentally, in Tables 1–8 and Table 11, the amounts of raw materials used are all parts by weight. Also in the followings, "Wallace hardness" refers to an IRHD measured by a hardness meter manufactured by Wallace Co., Ltd. of U.K.

Examples 1–2 and Comparative Example 1

To 100 parts by weight of an isoprene-isobutylene rubber were added 14 parts by weight of an alkylphenol-formaldehyde resin, 3 parts by weight of a phenolic novolac type epoxy resin and 7 parts by weight of an alicyclic epoxy resin (alicyclic diepoxy adipate). Primary crosslinking was conducted at 190° C. for 10 minutes by the use of a hot press, and then secondary crosslinking was conducted at 200° C. for 2 hours in a hot air convection oven. The compounding recipes and physical properties of crosslinked rubbers obtained therefrom, of Examples 1 and 2 are shown in Table 1. For comparison, also shown in Table 1 are the compounding recipe containing no epoxy resin and physical properties of crosslinked rubber obtained therefrom under the same crosslinking conditions, of Comparative Example 1.

Figure 1:
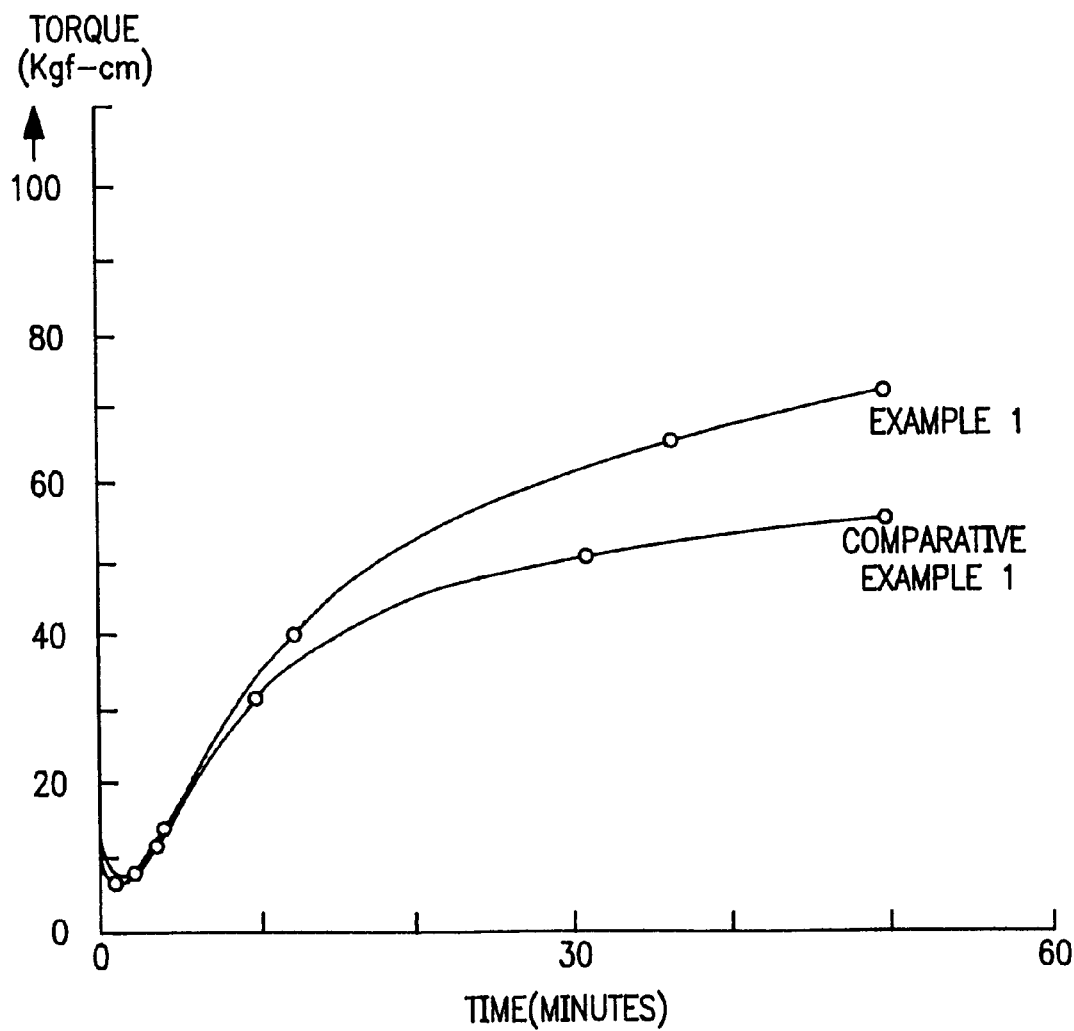
FIG. 1 shows curing curves of Example 1 and Comparative Example 1 when torque measurement was made at 190° C. by the use of an oscillating rheometer.

The curing curves of Example 1 and Comparative Example 1, obtained by torque measurement at 190° C. by the use of an oscillating rheometer (ASTM-100 Type, a product of Toyo Seiki Seisaku-sho, Ltd.) are shown in FIG. 1.

From comparison of Examples and Comparative Example 1, it is clear that addition of phenolic novolac type epoxy resin or alicyclic epoxy resin can significantly increase the hardness of isoprene-isobutylene rubber. In other words, viewed from Example 1 or 2, it is possible to reduce the amount of carbon black which is most effective for increase in hardness of synthetic rubber; viewed from Comparative Example 1, it is impossible to obtain a crosslinked rubber having the same hardness as that of Example 1 or 2 without adding a large amount of carbon black.

It is clear from the curing curves of FIG. 1 that phenolic novolac type epoxy resin has an effect of crosslinking acceleration.

TABLE 1

| | | Example 1 | Example 2 | Comparative Example 1 |
|---|---|---|---|---|
| Raw materials and amounts used | Butyl 365 (1) | 100 | 100 | 100 |
| | FT carbon (2) | 40 | 40 | 40 |
| | Calcined clay (3) | 100 | 100 | 100 |
| | Zinc oxide No. 3 | 5 | 5 | 5 |
| | Stearic acid | 1 | 1 | 1 |
| | TACKIROL 201 (4) | 14 | 14 | 14 |
| | EPPN 201H (5) | 3 | — | — |
| | CY-177 (6) | — | 7 | — |
| Physical properties | Tensile strength (kg/cm$^2$) (JIS K 6301) | 64 | 52 | 65 |
| | Elongation (%) (JIS K 6301) | 320 | 370 | 540 |
| | Hardness, JIS-A | 70 | 75 | 54 |
| | Hardness increase over Comparative Example 1 (7) | +16 | +21 | — |
| | Wallace hardness | 71 | 78 | 51 |
| | Hardness increase over Comparative Example 1 (8) | +20 | +27 | — |

Notes for Table 1
(1) Butyl 365 is an isoprene-isobutylene rubber produced by EXXON Kagaku K. K.
(2) There was used Asahi Thermal which is a carbon black produced by Asahi Carbon Co., Ltd.
(3) There was used Polyfil 80 produced by J. M. Huber Corporation.
(4) An alkylphenol-formaldehyde resin produced by Taoka Chemical Company, Limited.
(5) There was used a phenolic novolac type epoxy resin produced by Nippon Kayaku Co., Ltd., having an epoxy equivalent of 180–200 g/eq and a softening point of 65–72° C.
(6) There was used an alicyclic epoxy resin produced by Ciba Specialty Chemicals K. K., having an epoxy equivalent of 180–220 g/eq and a viscosity (25° C.) of 400–800 cp.
(7) [(Hardness of Example) - (hardness of Comparative Example)]
(8) [(Wallace hardness of Example) - (Wallace hardness of Comparative Example)]

Example 3 and Comparative Example 2

A raw material compound having the compounding recipe shown in Table 2, containing 100 parts by weight of an isoprene-isobutylene rubber, 17 parts by weight of an alkylphenol-formaldehyde resin and 1.8 parts by weight of an alicyclic epoxy resin (alicyclic diepoxy carboxylate) was subjected to crosslinking in the same manner as in Example 1 to obtain a crosslinked product. The physical properties thereof are shown in Table 2. For comparison, also shown in Table 2 are the physical properties of a crosslinked product of Comparative Example 2 obtained under the same crosslinking conditions using no epoxy resin. From comparison of Example 3 and Comparative Example 2, it is clear that use of alicyclic diepoxy carboxylate can significantly increase the hardness of isoprene-isobutylene rubber. An increase of 7 in both of JIS-A hardness and Wallace hardness was seen.

TABLE 2

|  |  | Example 3 | Comparative Example 2 |
|---|---|---|---|
| Raw materials and amounts used | Butyl 365 (1) | 100 | 100 |
|  | FT carbon (2) | 40 | 40 |
|  | Calcined clay (3) | 100 | 100 |
|  | Zinc oxide No. 3 | 5 | 5 |
|  | Stearic acid | 1 | 1 |
|  | TACKIROL 201 (4) | 17 | 17 |
|  | CY-179 (5) | 1.8 | — |
| Physical properties | Tensile strength (kg/cm²) | 58 | 55 |
|  | Elongation (%) | 450 | 500 |
|  | Hardness, JIS-A | 65 | 56 |
|  | Hardness increase over Comparative Example 2 (6) | +9 | — |
|  | Wallace hardness | 62 | 53 |
|  | Hardness increase over Comparative Example 2 (7) | +9 | — |

Notes for Table 2
(1), (2), (3) and (4) are the same as (1), (2), (3) and (4) in Notes for Table 1.
(5) There was used an alicyclic epoxy resin produced by Ciba Specialty Chemicals K. K., having an epoxy equivalent of 133–143 g/eq and a viscosity (25° C.) of 350 cp.
(6) and (7) are the same as (7) and (8) in Notes for Table 1.

Examples 4–5 and Comparative Example 3

A raw material compound having the compounding recipe shown in Table 3, containing 100 parts by weight of an isoprene-isobutylene rubber, 18 parts by weight of an alkylphenol-formaldehyde resin and 2 parts by weight of a bisphenol F type epoxy resin or 1 part by weight of a glycidyl ester type epoxy resin was subjected to crosslinking in the same manner as in Example 1 to obtain two crosslinked products. The physical properties thereof are shown in Table 3. For comparison, also shown in Table 3 are the physical properties of a crosslinked product of Comparative Example 3 obtained under the same crosslinking conditions using no epoxy resin. Increases of 8 in JIS-A hardness and 13 in Wallace hardness were seen.

TABLE 3

|  |  | Example 4 | Example 5 | Comparative Example 3 |
|---|---|---|---|---|
| Raw materials and amounts used | Butyl 365 (1) | 100 | 100 | 100 |
|  | FT carbon (2) | 40 | 40 | 40 |
|  | Calcined clay (3) | 50 | 50 | 50 |
|  | Zinc oxide No. 3 | 5 | 5 | 5 |
|  | Stearic acid | 1 | 1 | 1 |
|  | TACKIROL 201 (4) | 18 | 18 | 18 |
|  | YL 983 (5) | 2 | — | — |
|  | CY 192-1 (6) | — | 1 | — |
| Physical properties | Tensile strength (kg/cm²) | 65 | 60 | 86 |
|  | Elongation (%) | 510 | 580 | 520 |
|  | Hardness, JIS-A | 58 | 58 | 50 |
|  | Hardness increase over Comparative Example 3 (7) | +8 | +8 | — |
|  | Wallace hardness | 60 | 60 | 47 |
|  | Hardness increase over Comparative Example 3 (8) | +13 | +13 | — |

Notes for Table 3
(1), (2), (3), (4), (7) and (8) are the same as (1), (2), (4), (7) and (8) in Note for Table 1.
(5) There was used Epikote YL 983 (a bis-phenol F type epoxy resin produced by Yuka Shell Epoxy K. K.).
(6) There was used a glycidyl ester type epoxy resin (Araldite CY 192-1 produced by Ciba Specialty Chemicals K. K.) having an epoxy content of 6.4 eq/kg.

Example 6 and Comparative Example 4

Figure 2:
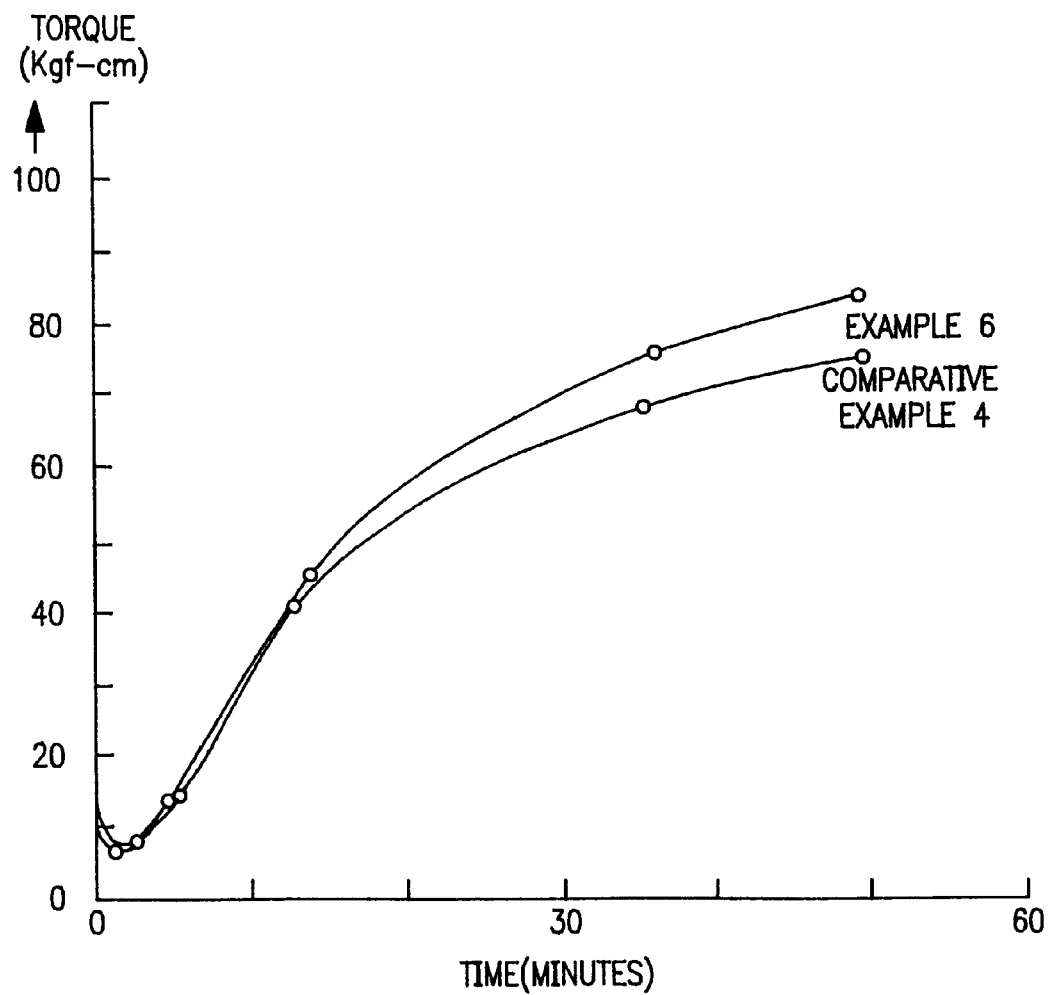
FIG. 2 shows curing curves of Example 6 and Comparative Example 4 when torque measurement was made at 190° C. by the use of an oscillating rheometer.

A raw material compound having the compounding recipe shown in Table 4, containing 100 parts by weight of an isoprene-isobutylene rubber, 18 parts by weight of an alkylphenol-formaldehyde resin and 2 parts by weight of a cresol novolac type epoxy resin was subjected to crosslinking in the same manner as in Example 1 to obtain a crosslinked product. The compounding recipe and physical properties of crosslinked product obtained therefrom, of Example 6 are shown in Table 4. For comparison, also shown in Table 4 are the physical properties of a crosslinked product of Comparative Example 4 obtained under the same crosslinking conditions using no epoxy resin. Addition of epoxy resin gave increases of 11 in JIS-A hardness and 14 in Wallace hardness. In FIG. 2 are shown the curing curves of Example 6 and Comparative Example 4 when torque measurement was made at 190° C. by the use of an oscillating rheometer. FIG. 2 shows that the cresol novolac resin has an effect of crosslinking acceleration.

TABLE 4

|  |  | Example 6 | Comparative Example 4 |
|---|---|---|---|
| Raw materials and amounts used | Butyl 365 (1) | 100 | 100 |
|  | FT carbon (2) | 50 | 50 |
|  | Nulok 390 (3) | 50 | 50 |
|  | Zinc oxide No. 3 | 5 | 5 |
|  | Stearic acid | 1 | 1 |
|  | TACKIROL 201 (4) | 18 | 18 |
|  | EOCN 1020 (5) | 2 | — |
| Physical properties | Tensile strength (kg/cm²) | 118 | 112 |
|  | Elongation (%) | 370 | 390 |
|  | Hardness, JIS-A | 76 | 65 |
|  | Hardness increase over Comparative Example 4 (6) | +11 | — |
|  | Wallace hardness | 84 | 70 |
|  | Hardness increase over Comparative Example 4 (7) | +14 | — |

Notes for Table 4
(1), (2) and (4) are the same as (1), (2) and (4) in Notes for Table 1.
(3) There was used an aminosilane-treated clay of J. M. Huber Corporation.
(5) There was used a cresol novolac type epoxy resin produced by Nippon Kayaku Co., Ltd., having an epoxy equivalent of 194–204 g/eq and a softening point of 64–68° C.
(6) and (7) are the same as (7) and (8) in Notes for Table 1.

Example 7 and Comparative Example 5

A raw material compound having the compounding recipe shown in Table 5, containing 100 parts by weight of an isoprene-isobutylene rubber, 18 parts by weight of an alkylphenol-formaldehyde resin and 10 parts by weight of a naphthol-modified novolac type epoxy resin was subjected to crosslinking in the same manner as in Example 1 to obtain a crosslinked product. The compounding recipe and physical properties of crosslinked product obtained therefrom, of Example 7 are shown in Table 5. For comparison, also shown in Table 5 are the physical properties of a crosslinked product of Comparative Example 5 obtained under the same crosslinking conditions using no epoxy resin. Addition of epoxy resin gave increases of 20 in JIS-A hardness and 36 in Wallace hardness.

TABLE 5

|  |  | Example 7 | Comparative Example 5 |
|---|---|---|---|
| Raw materials and amounts used | Butyl 365 (1) | 100 | 100 |
|  | FT carbon (2) | 50 | 50 |
|  | Nulok 390 (3) | 50 | 50 |
|  | Zinc oxide No. 3 | 5 | 5 |
|  | Stearic acid | 1 | 1 |
|  | TACKIROL 201 (4) | 8 | 8 |
|  | NC 7000L (5) | 10 | — |
| Physical properties | Tensile strength (kg/cm²) | 82 | 104 |
|  | Elongation (%) | 410 | 470 |
|  | Hardness, JIS-A | 80 | 60 |
|  | Hardness increase over Comparative Example 5 (6) | +20 | — |
|  | Wallace hardness | 93 | 57 |
|  | Hardness increase over Comparative Example 5 (7) | +36 | — |

Notes for Table 5
(1), (2) and (4) are the same as (1), (2) and (4) in Notes for Table 1.
(3) is the same as (3) in Notes for Table 4.
(5) There was used a naphthol-modified novolac type epoxy resin produced by Nippon Kayaku Co., Ltd., having an epoxy equivalent of 230 g/eq and a softening point of 88.3° C.
(6) and (7) are the same as (7) and (8) in Notes for Table 1.

Example 8 and Comparative Example 6

A raw material compound having the compounding recipe shown in Table 6, containing 100 parts by weight of an isoprene-isobutylene rubber, 20 parts by weight of an alkylphenol-formaldehyde resin and 2.5 parts by weight of a bisphenol A type epoxy resin was subjected to crosslinking in the same manner as in Example 1 to obtain a crosslinked product. The compounding recipe and physical properties of crosslinked product obtained therefrom, of Example 8 are shown in Table 6. For comparison, also shown in Table 6 are the physical properties of a crosslinked product of Comparative Example 6 obtained under the same crosslinking conditions using no epoxy resin. Addition of epoxy resin gave increases of 10 in JIS-A hardness and 13 in Wallace hardness.

TABLE 6

|  |  | Example 8 | Comparative Example 6 |
|---|---|---|---|
| Raw materials and amounts used | Butyl 365 (1) | 100 | 100 |
|  | FT carbon (2) | 50 | 50 |
|  | Nulok 390 (3) | 50 | 50 |
|  | Zinc oxide No. 3 | 5 | 5 |
|  | Stearic acid | 1 | 1 |
|  | TACKIROL 201 (4) | 20 | 20 |
|  | Epikote 828 (5) | 2.5 | — |
| Physical properties | Tensile strength (kg/cm²) | 105 | 112 |
|  | Elongation (%) | 400 | 450 |
|  | Hardness, JIS-A | 73 | 63 |
|  | Hardness increase over Comparative Example 6 (6) | +10 | — |
|  | Wallace hardness | 81 | 68 |
|  | Hardness increase over Comparative Example 6 (7) | +13 | — |

Notes for Table 6
(1), (2) and (4) are the same as (1), (2) and (4) in Notes for Table 1.
(3) is the same as (3) in Notes for Table 4.
(5) There was used Epikote 828 (a bisphenol A type epoxy resin produced by Yuka Shell Epoxy K. K.) having an epoxy equivalent of 184–194 g/eq.
(6) and (7) are the same as (7) and (8) in Notes for Table 1.

Example 9 and Comparative Example 7

Figure 3:
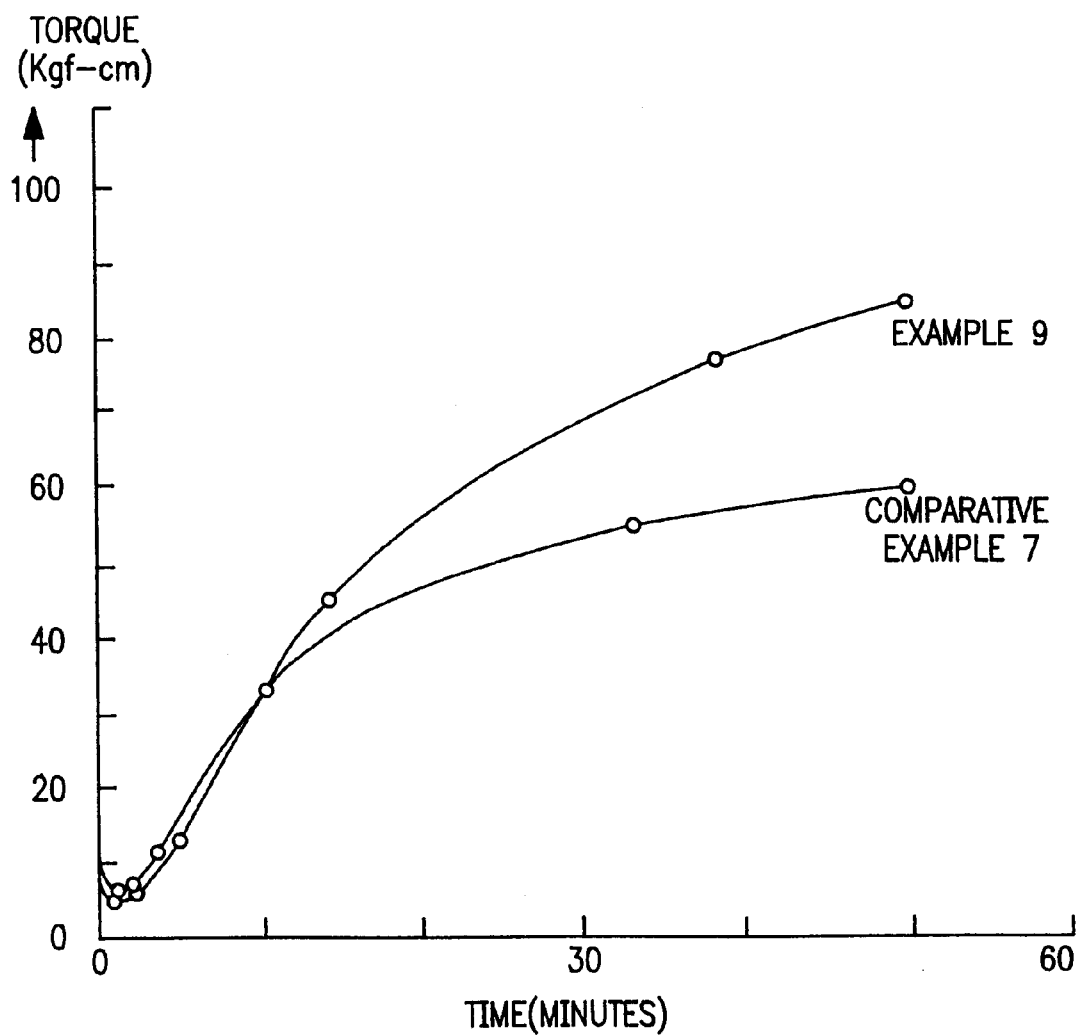
FIG. 3 shows curing curves of Example 9 and Comparative Example 7 when torque measurement was made at 190° C. by the use of an oscillating rheometer.

A raw material compound having the compounding recipe shown in Table 7, containing 100 parts by weight of an isoprene-isobutylene rubber, 20 parts by weight of an alkylphenol-formaldehyde resin and 9 parts by weight of a polyfunctional type epoxy resin was subjected to crosslinking in the same manner as in Example 1 to obtain a crosslinked product. The compounding recipe and physical properties of crosslinked product obtained therefrom, of Example 9 are shown in Table 7. For comparison, also shown in Table 7 are the physical properties of a crosslinked product of Comparative Example 7 obtained under the same crosslinking conditions using no epoxy resin. Addition of epoxy resin gave increases of 21 in JIS-A hardness and 25 in Wallace hardness. In FIG. 3 are shown the curing curves of Example 9 and Comparative Example 7 obtained when torque measurement was made at 190° C. by the use of an oscillating rheometer. FIG. 3 indicates that the polyfunctional epoxy resin has a high effect of crosslinking effect.

TABLE 7

|  |  | Example 9 | Comparative Example 7 |
|---|---|---|---|
| Raw materials and amounts used | Butyl 365 (1) | 100 | 100 |
|  | FT carbon (2) | 40 | 40 |
|  | Calcined clay (3) | 100 | 100 |
|  | Zinc oxide No. 3 | 5 | 5 |
|  | Stearic acid | 1 | 1 |
|  | TACKIROL 201 (4) | 20 | 20 |
|  | EPPN 502H (5) | 9 | — |
| Physical properties | Tensile strength (kg/cm²) | 58 | 68 |
|  | Elongation (%) | 290 | 490 |
|  | Hardness, JIS-A | 78 | 56 |
|  | Hardness increase over Comparative Example 7 (6) | +21 | — |
|  | Wallace hardness | 78 | 53 |
|  | Hardness increase over Comparative Example 7 (7) | +25 | — |

Notes for Table 7
(1), (2) and (4) are the same as (1), (2) and (4) in Notes for Table 1.
(3) is the same as (3) in Notes for Table 4.
(5) There was used a polyfunctional epoxy resin produced by Nippon Kayaku Co., Ltd., having an epoxy equivalent of 158–178 g/eq.
(6) and (7) are the same as (7) and (8) in Notes for Table 1.

Examples 10–18 and Comparative Example 8

Figure 4:
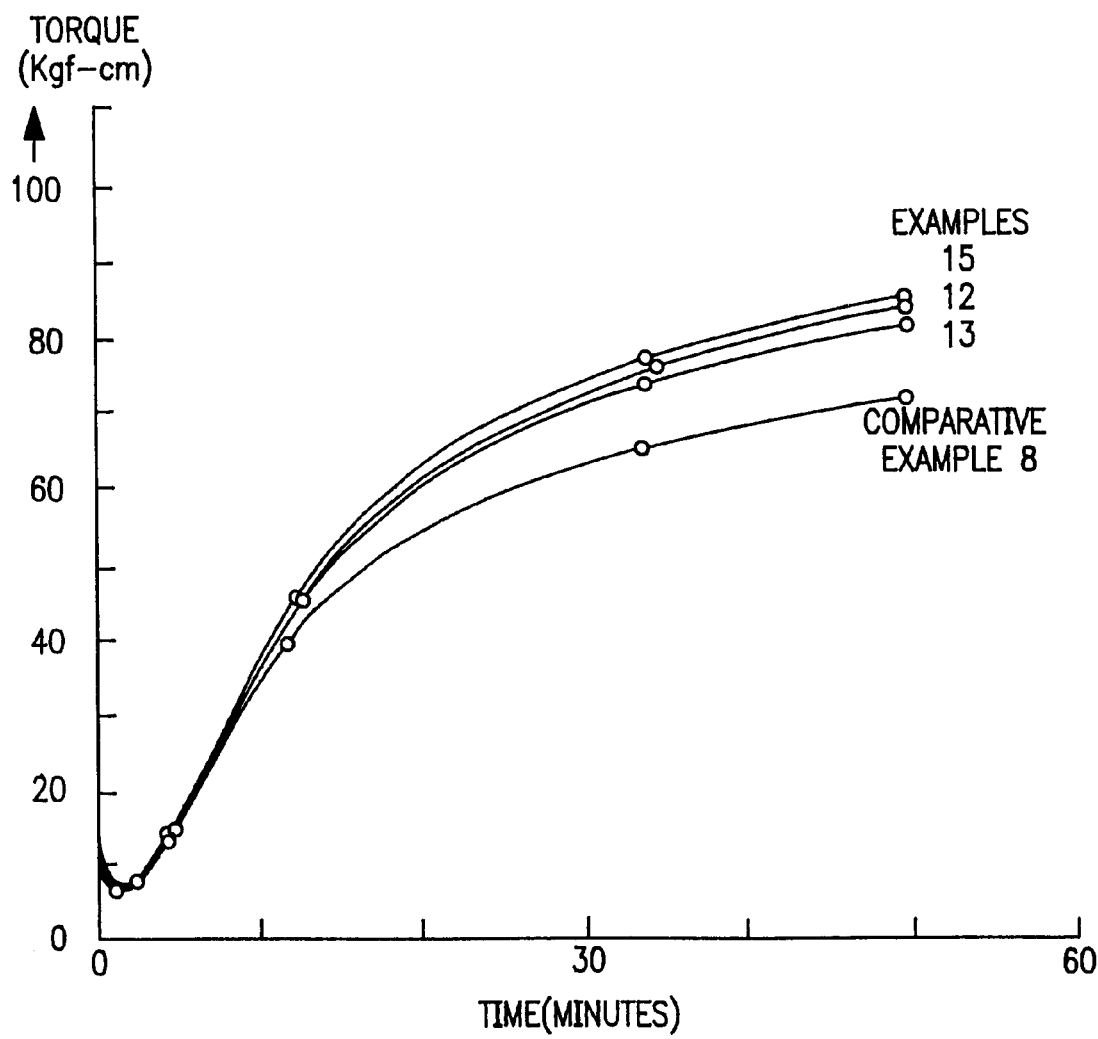
FIG. 4 shows curing curves of Examples 12, 13 and 15 and Comparative Example 8 when torque measurement was made at 190° C. by the use of an oscillating rheometer.

A raw material compound having the compounding recipe shown in Table 8, containing 100 parts by weight of an isoprene-isobutylene rubber, 110 parts by weight of inorganic fillers, 50 parts by weight of carbon black, 18 parts by weight of an alkylphenol-formaldehyde resin and 2 parts by weight of an epoxy resin (the compound was common to Examples 10–18 and Comparative Example 8 except for the epoxy resin which was different in each of Examples 10–18 and Comparative Example 8), was subjected to crosslinking in the same manner as in Example 1 to obtain crosslinked products of Examples 10–18 and Comparative Example 8. The physical properties of these crosslinked products are shown in Table 9 and Table 10. From comparison of Examples 10–18 and Comparative Example 8, it is clear that their tensile strengths (kg/cm²) were about the same level but there were increases of 7–9 in JIS-A hardness and 11–13 in Wallace hardness. When the increase in hardness obtained in Examples is obtained by increasing the amount of carbon black (having a high reinforcing action) used, the hardness increase corresponds to an increase in carbon amount by about 15–20 parts by weight. In FIG. 4 are shown the curing curves of Examples 12, 13 and 15 and Comparative Example 8 when torque measurement was made at 190° C. by the use of an oscillating rheometer. It is clear from the curing curves that the rate of crosslinking of butyl rubber with alkylphenol-formaldehyde resin is accelerated by the use of phenolic novolac type epoxy resin, cresol novolac type epoxy resin or polyfunctional epoxy resin. Similar curing curves were obtained in other Examples wherein other epoxy resins were added.

TABLE 8

| Raw materials and amounts used | IIR 365 (1) | 100 parts by weight |
|---|---|---|
| | FT (2) | 50 |
| | Zinc oxide No. 3 | 20 |
| | Calcium carbonate | 10 |
| | Calcined clay (3) | 50 |
| | Polykap CS (4) | 30 |
| | TACKIROL 201 (5) | 18 |
| | Epoxy resin (shown in Tables 9 and 10) | 2 |

Notes for Table 8
(1), (2), (3) and (5) are the same as (1), (2), (3) and (4) in Notes for Table 1.
(4) There was used a vinylsilane-treated clay produced by J. M. Huber Corporation.

TABLE 9

Physical properties

| Examples | 10 (1) | 11 (2) | 12 (3) | 13 (4) | 14 (5) |
|---|---|---|---|---|---|
| Epoxy resin used | AER2600 | YL 983 | EPPN201H | EOCN103S | EOCN1020 |
| Tensile strength (kg/cm$^2$) | 64 | 62 | 70 | 72 | 73 |
| Elongation (%) | 430 | 420 | 390 | 380 | 360 |
| Hardness, JIS-A | 66 | 66 | 66 | 66 | 65 |
| Hardness increase over Comparative Example 8 (10) | +8 | +8 | +8 | +8 | +7 |
| Wallace hardness | 71 | 72 | 72 | 70 | 71 |
| Hardness increase over Comparative Example 8 (11) | +12 | +13 | +13 | +11 | +12 |

TABLE 10

Physical properties

| Examples | 15 (6) | 16 (7) | 17 (8) | 18 (9) | Comparative Example 8 |
|---|---|---|---|---|---|
| Epoxy resin used | EPPN502H | CY177 | CY179 | AER2500 | Not used |
| Tensile strength (kg/cm$^2$) | 75 | 58 | 62 | 66 | 67 |
| Elongation (%) | 350 | 510 | 410 | 370 | 630 |
| Hardness, JIS-A | 66 | 67 | 67 | 67 | 58 |
| Hardness increase over Comparative Example 8 (10) | +8 | +9 | +9 | +9 | — |
| Wallace hardness | 72 | 72 | 71 | 72 | 59 |
| Hardness increase over Comparative Example 8 (11) | +13 | +13 | +12 | +13 | — |

Notes for Tables 9 and 10
(1) A bisphenol A type epoxy resin produced by Asahi-CIBA Limited, having an epoxy equivalent of 180–200 g/eq.
(2) The same bisphenol F type epoxy resin as used in Example 4.
(3) The same phenolic novolac type epoxy resin as used in Example 1.
(4) A cresol novolac type epoxy resin produced by Nippon Kayaku Co., Ltd., having an epoxy equivalent of 209–219 g/eq.
(5) The same cresol novolac type epoxy resin as used in Example 6.
(6) The same polyfunctional epoxy resin as used in Example 9.
(7) The same alicyclic epoxy resin as used in Example 2.
(8) The same alicyclic epoxy resin as used in Example 3.
(9) A bisphenol A type epoxy resin produced by Asahi-CIBA Limited, having an epoxy equivalent of 180–190 g/eq.
(10) and (11) are the same as (7) and (8) in Notes for Table 1.

Examples 19–27 and Comparative Example 9

A raw material compound having the compounding recipe shown in Table 11, containing 100 parts by weight of an isoprene-isobutylene rubber, 145 parts by weight of inorganic fillers, 15 parts by weight of carbon black, 18 parts by weight of an alkylphenol-formaldehyde resin and 4 parts by weight of an epoxy resin (the compound was common to Examples 19–27 and Comparative Example 9 except for the epoxy resin which was different in each of Examples 19–27 and Comparative Example 9), as subjected to crosslinking in the same manner as in Example 1 to obtain crosslinked products of Examples 19–27 and Comparative Example 9. The physical properties of these crosslinked products are shown in Table 12 and Table 13. From comparison of Examples 19–27 and Comparative Example 9, it is clear that their tensile strengths (kg/cm²) were about the same level but there were increases of 10–14 in JIS-A hardness and 16–19 in Wallace hardness. The reason is presumed to be that the epoxy resin of the present invention crosslinks with the alkylphenol-formaldehyde resin used, inviting an increase in crosslink density. The above increase in hardness corresponds to 20–30 parts by weight of carbon black when the increase is obtained with the carbon black, as generally known by those skilled in the art.

TABLE 11

| Raw materials and amounts used | IIR 365 (1) | 100 parts by weight |
|---|---|---|
| | FT (2) | 15 |
| | Zinc oxide No. 3 | 10 |
| | Calcium carbonate | 5 |
| | Calcined clay (3) | 50 |
| | Polykap CS (4) | 20 |
| | Nulok 390 (5) | 60 |
| | TACKIROL 201 (5) | 18 |
| | Epoxy resin (7) | 4 |

Notes for Table 11
(1), (2), (3), (4) and (6) are the same as (1), (2), (3), (4) and (5) in Notes for Table 8.
(5) is the same as (3) in Notes for Table 4.
(7) Shown in Table 12 and Table 13.

TABLE 12

| | Physical properties | | | | |
|---|---|---|---|---|---|
| Examples | 19 (1) | 20 (2) | 21 (3) | 22 (4) | 23 (5) |
| Epoxy resin used | AER2600 | YL 983 | EPPN201H | EOCN103S | EOCN1020 |
| Tensile strength (kg/cm²) | 75 | 77 | 88 | 88 | 86 |
| Elongation (%) | 290 | 290 | 270 | 250 | 230 |
| Hardness, JIS-A | 76 | 76 | 77 | 77 | 78 |
| Hardness increase over Comparative Example 9 (10) | +12 | +12 | +13 | +13 | +14 |
| Wallace hardness | 84 | 84 | 86 | 86 | 85 |
| Hardness increase over Comparative Example 9 (11) | +17 | +17 | +19 | +19 | +18 |

TABLE 13

| | Physical properties | | | | |
|---|---|---|---|---|---|
| Examples | 24 (6) | 25 (7) | 26 (8) | 27 (9) | Comparative Example 9 |
| Epoxy resin used | EPPN502H | CY177 | CY179 | AER2500 | Not used |
| Tensile strength (kg/cm²) | 86 | 62 | 66 | 74 | 73 |
| Elongation (%) | 260 | 380 | 330 | 290 | 550 |
| Hardness, JIS-A | 74 | 76 | 77 | 76 | 64 |
| Hardness increase over Comparative Example 9 (10) | +10 | +12 | +13 | +12 | — |
| Wallace hardness | 84 | 85 | 86 | 83 | 67 |
| Hardness increase over Comparative Example 9 (11) | +17 | +18 | +19 | +16 | — |

Notes for Tables 12 and 13
(1) to (9) are the same as (1) to (9) in Notes for Tables 9 and 10.
(10) and (11) are the same as (7) and (8) in Notes for Table 1.

What is claimed is:

1. A method for crosslinking an isoprene-isobutylene rubber, which comprises
    forming a composition comprising
        100 parts by weight of an isoprene-isobutylene rubber,
        8–25 parts by weight of an alkylphenol-formaldehyde resin and
        0.3–10 parts by weight of at least one kind of epoxy resin selected from the group consisting of a bisphenol A epoxy resin, a bisphenol F epoxy resin, a bisphenol AD epoxy resin, a bisphenol epoxy resin obtained by substituting one methyl group added to the skeleton of a bisphenol AD epoxy resin with a $C_{2-12}$ alkyl group, a phenolic novolac epoxy resin, a cresol novolac epoxy resin, a triphenyl methane polyfunctional epoxy resin, an alicyclic epoxy resin, a naphthol-modified novolac epoxy resin, a diglycidyl o-, m- or p-phthalate epoxy resin and a diglycidyl o-, m- or p-hydrophthalate epoxy resin;

and crosslinking said composition.

2. A method for crosslinking an isoprene-isobutylene rubber, which comprises
forming a composition comprising
100 parts by weight of an isoprene-isobutylene rubber,
70–180 parts by weight of at least one kind of filler selected from the group consisting of kaolin clay, talc, calcium carbonate, mica, silica and zinc oxides,
10–60 parts by weight of carbon black,
8–25 parts by weight of an alkylphenol-formaldehyde resin and
0.3–10 parts by weight of at least one kind of epoxy resin selected from the group consisting of bisphenol A epoxy resin, a bisphenol F epoxy resin, a bisphenol AD epoxy resin, a bisphenol epoxy resin obtained by substituting one methyl group added to the skeleton of a bisphenol AD epoxy resin with a $C_{2-12}$ alkyl group, a phenolic novolac epoxy resin, a cresol novolac epoxy resin, a triphenyl methane polyfunctional epoxy resin, an alicyclic epoxy resin, a naphthol-modified novolac epoxy resins a diglycidyl o-, m- or p-phthalate epoxy resin and a diglycidyl o-, m- or p-hydrophthalate epoxy resin; and
crosslinking said composition.

3. A method for crosslinking an isoprene-isobutylene rubber according to claim 1 or 2, wherein the alkylphenol-formaldehyde resin is a compound represented by the following formula:

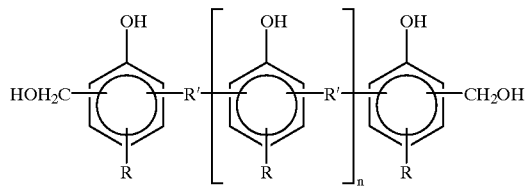

wherein n is 0–15, each R is a $C_{1-10}$ aliphatic alkyl group, and each R' is —$CH_2$— or —$CH_2OCH_2$—.

4. A method for crosslinking an isoprene-isobutylene rubber according to claim 1 or 2, wherein the epoxy resin added to the isoprene-isobutylene rubber is a bisphenol A or F or AD epoxy resin or a bisphenol epoxy resin obtained by substituting one methyl group added to the skeleton of an AD epoxy resin with a $C_{2-12}$ alkyl group.

5. A method for crosslinking an isoprene-isobutylene rubber according to claim 1 or 2, wherein the epoxy resin added to the isoprene-isobutylene rubber is a phenolic novolac epoxy resin.

6. A method for crosslinking an isoprene-isobutylene rubber according to claim 1 or 2, wherein the epoxy resin added to the isoprene-isobutylene rubber is a cresol novolac epoxy resin.

7. A method for crosslinking an isoprene-isobutylene rubber according to claim 1 or 2, wherein the epoxy resin added to the isoprene-isobutylene rubber is a triphenyl methane polyfunctional epoxy resin.

8. A method for crosslinking an isoprene-isobutylene rubber according to claim 1 or 2, wherein the epoxy resin added to the isoprene-isobutylene rubber is an alicyclic epoxy resin selected from the group consisting of alicyclic diepoxy acetal, alicyclic diepoxy adipate, alicyclic diepoxy carboxylate and vinylcyclohexene dioxide.

9. A method for crosslinking an isoprene-isobutylene rubber according to claim 1 or 2, wherein the epoxy resin added to the isoprene-isobutylene rubber is a naphthol-modified novolac epoxy resin.

10. A method for crosslinking an isoprene-isobutylene rubber according to claim 1 or 2, wherein the epoxy resin added to the isoprene-isobutylene rubber is a diglycidyl o-, m- or p-phthalate epoxy resin or o-, m- or a glycidyl p-hydrophthalate (the aromatic ring is hydrogenated) epoxy resin selected from the group consisting of diglycidyl phthalate, diglycidyl tetrahydrophthalate, dimethylglycidyl phthalate, a diglycidyl ester of dimer acid, diglycidyl hexahydrophthalate and dimethylglycidyl hexahydrophthalate.

11. A crosslinked isoprene-isobutylene rubber obtained by crosslinking a composition which comprises
100 parts by weight of an isoprene-isobutylene rubber,
8–25 parts by weight of an alkylphenol-formaldehyde resin and
0.3–10 parts by weight of at least one kind of epoxy resin selected from the group consisting of a bisphenol A epoxy resin, a bisphenol F epoxy resin, a bisphenol AD epoxy resin, a bisphenol epoxy resin obtained by substituting one methyl group added to the skeleton of a bisphenol AD epoxy resin with a $C_{2-12}$ alkyl group, a phenolic novolac epoxy resin, a cresol novolac epoxy resin, a triphenyl methane polyfunctional epoxy resin, an alicyclic epoxy resin, a naphthol-modified novolac epoxy resin, a diglycidyl o-, m- or p-phthalate epoxy resin and a diglycidyl o-, m- or p-hydrophthalate epoxy resin.

12. A crosslinked isoprene-isobutylene rubber obtained by crosslinking a composition which comprises
100 parts by weight of an isoprene-isobutylene rubber,
70–80 parts by weight of at least one kind of filler selected from the group consisting of kaolin clay, talc, calcium carbonate, mica, silica and zinc oxide,
10–60 parts by weight of carbon black,
8–25 parts by weight of an alkylphenol-formaldehyde resin and
0.3–10 parts by weight of at least one kind of epoxy resin selected from the group consisting of a bisphenol A epoxy resin, a bisphenol F epoxy resin, a bisphenol AD epoxy resin, a bisphenol epoxy resin obtained by substituting one methyl group added to the skeleton of a bisphenol AD epoxy resin with a $C_{2-12}$ alkyl group, a phenolic novolac epoxy resin, a cresol novolac epoxy resin, a triphenyl methane polyfunctional epoxy resin, an alicyclic epoxy resin, a naphthol-modified novolac epoxy resin, a diglycidyl o-, m- or p-phthalate epoxy resin and a diglycidyl o-, m- or p-hydrophthalate epoxy resin.

13. A crosslinked isoprene-isobutylene rubber according to claim 11 or 12, wherein the alkylphenol-formaldehyde resin is a compound represented by the following formula:

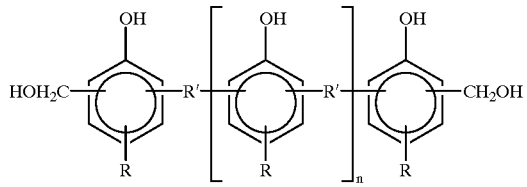

wherein n is 0–15, each R is a $C_{1-10}$ aliphatic alkyl group, and each R' is —$CH_2$— or —$CH_2OCH_2$—.

14. A crosslinked isoprene-isobutylene rubber according to claim 11 or 12, wherein the epoxy resin added to the isoprene-isobutylene rubber is a bisphenol A or F or AD epoxy resin or a bisphenol epoxy resin obtained by substituting one methyl group added to the skeleton of an AD epoxy resin with a $C_{2-12}$ alkyl group.

15. A crosslinked isoprene-isobutylene rubber according to claim 11 or 12, wherein the epoxy resin added to the isoprene-isobutylene rubber is a phenolic novolac epoxy resin.

16. A crosslinked isoprene-isobutylene rubber according to claim 11 or 12, wherein the epoxy resin added to the isoprene-isobutylene rubber is a cresol novolac epoxy resin.

17. A crosslinked isoprene-isobutylene rubber according to claim 11 or 12, wherein the epoxy resin added to the isoprene-isobutylene rubber is a triphenyl methane polyfunctional epoxy resin.

18. A crosslinked isoprene-isobutylene rubber according to claim 11 or 12, wherein the epoxy resin added to the isoprene-isobutylene rubber is an alicyclic epoxy resin selected from the group consisting of alicyclic diepoxy acetal, alicyclic diepoxy adipate, alicyclic diepoxy carboxylate and vinylcyclohexene dioxide.

19. A crosslinked isoprene-isobutylene rubber according to claim 11 or 12, wherein the epoxy resin added to the isoprene-isobutylene rubber is a naphthol-modified novolac epoxy resin.

20. A crosslinked isoprene-isobutylene rubber according to claim 11 or 12, wherein the epoxy resin added to the isoprene-isobutylene rubber is a diglycidyl o-, m- or p-phthalate epoxy resin or o-, m- or a glycidyl p-hydrophthalate (the aromatic ring is hydrogenated) epoxy resin selected from the group consisting of diglycidyl phthalate, diglycidyl tetrahydrophthalate, dimethylglycidyl phthalate, a diglycidyl ester of dimer acid, diglycidyl hexahydrophthalate and dimethylglycidyl hexahydrophthalate.

21. A rubber product produced by using a crosslinked isoprene-isobutylene rubber set forth in claim 11 or 12.

* * * * *